Dec. 12, 1961 B. M. G. GOLDMANN 3,012,545
MACHINES
Filed Sept. 3, 1957 9 Sheets-Sheet 1
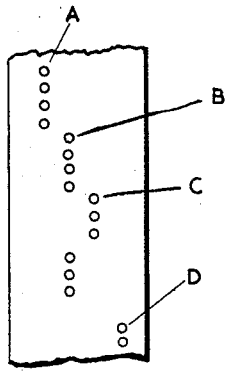
FIG. 1a.
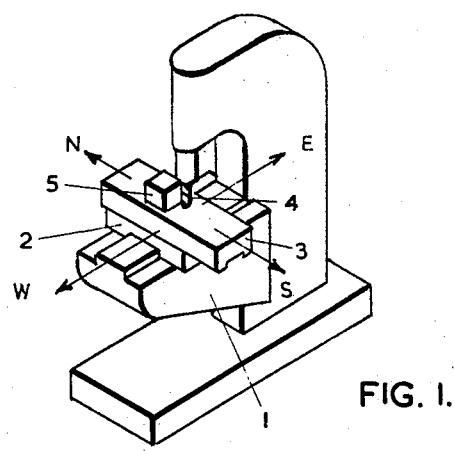
FIG. 1.
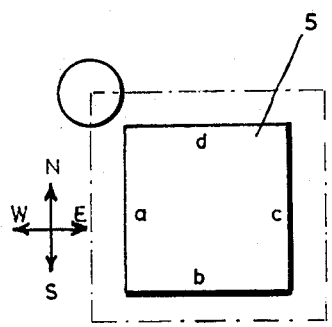
FIG. 2.
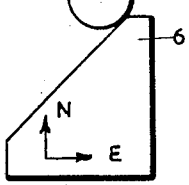
FIG. 3.
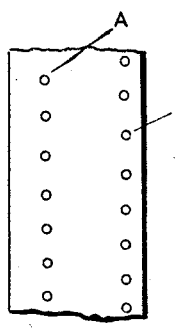
FIG. 3a.
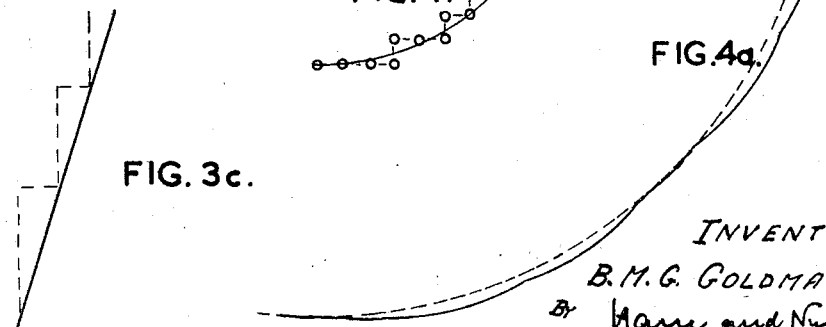
FIG. 3b.
FIG. 3c.
FIG. 4.
FIG. 4a.
INVENTOR
B. M. G. GOLDMANN
By Hann and Nydick
ATTORNEYS Dec. 12, 1961     B. M. G. GOLDMANN     3,012,545
MACHINES
Filed Sept. 3, 1957     9 Sheets-Sheet 2
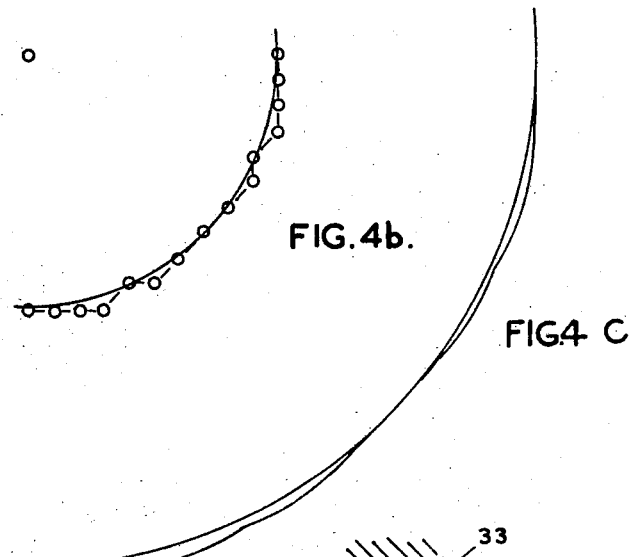
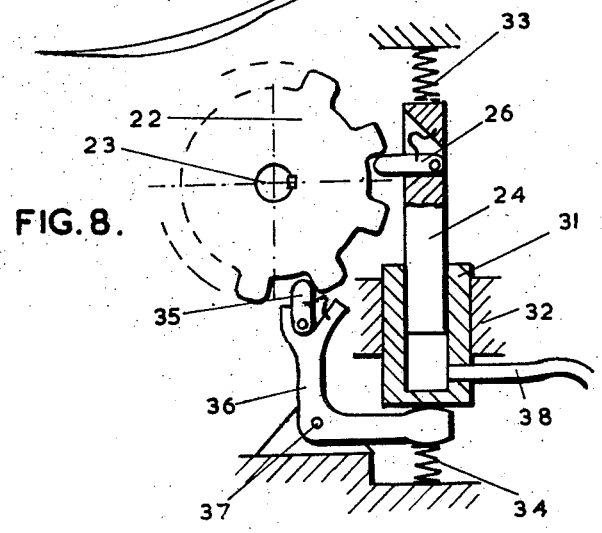
INVENTOR
B. M. G. GOLDMANN
By Hane and Nydick
ATTORNEYS Dec. 12, 1961  B. M. G. GOLDMANN  3,012,545
MACHINES
Filed Sept. 3, 1957  9 Sheets-Sheet 3
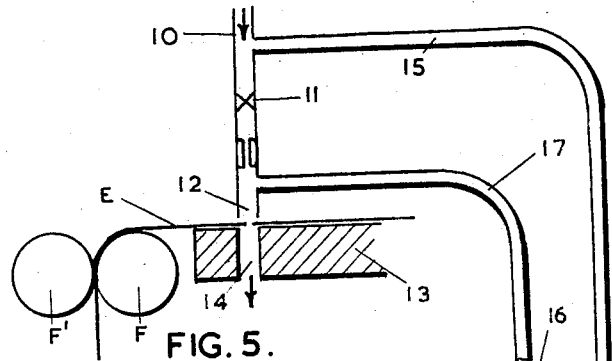
FIG. 5.
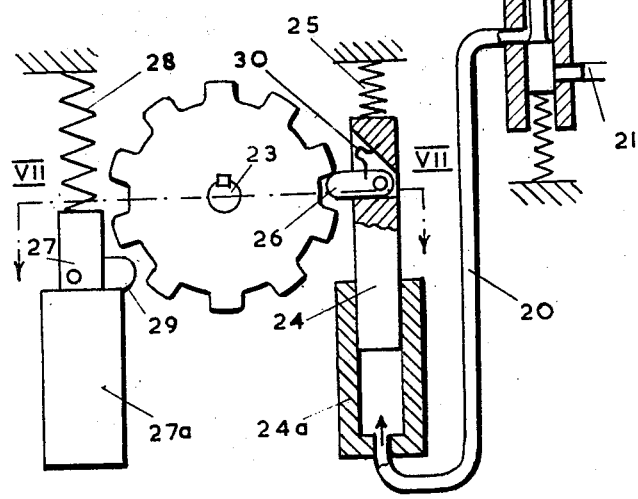
FIG. 6.
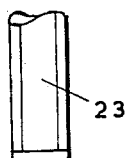
FIG. 7.
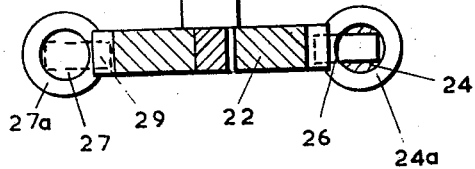
INVENTOR
B. M. G. GOLDMANN
ATTORNEYS Dec. 12, 1961  B. M. G. GOLDMANN  3,012,545
MACHINES
Filed Sept. 3, 1957  9 Sheets-Sheet 4

INVENTOR
B. M. G. GOLDMANN
By Hane and Nydick
ATTORNEYS

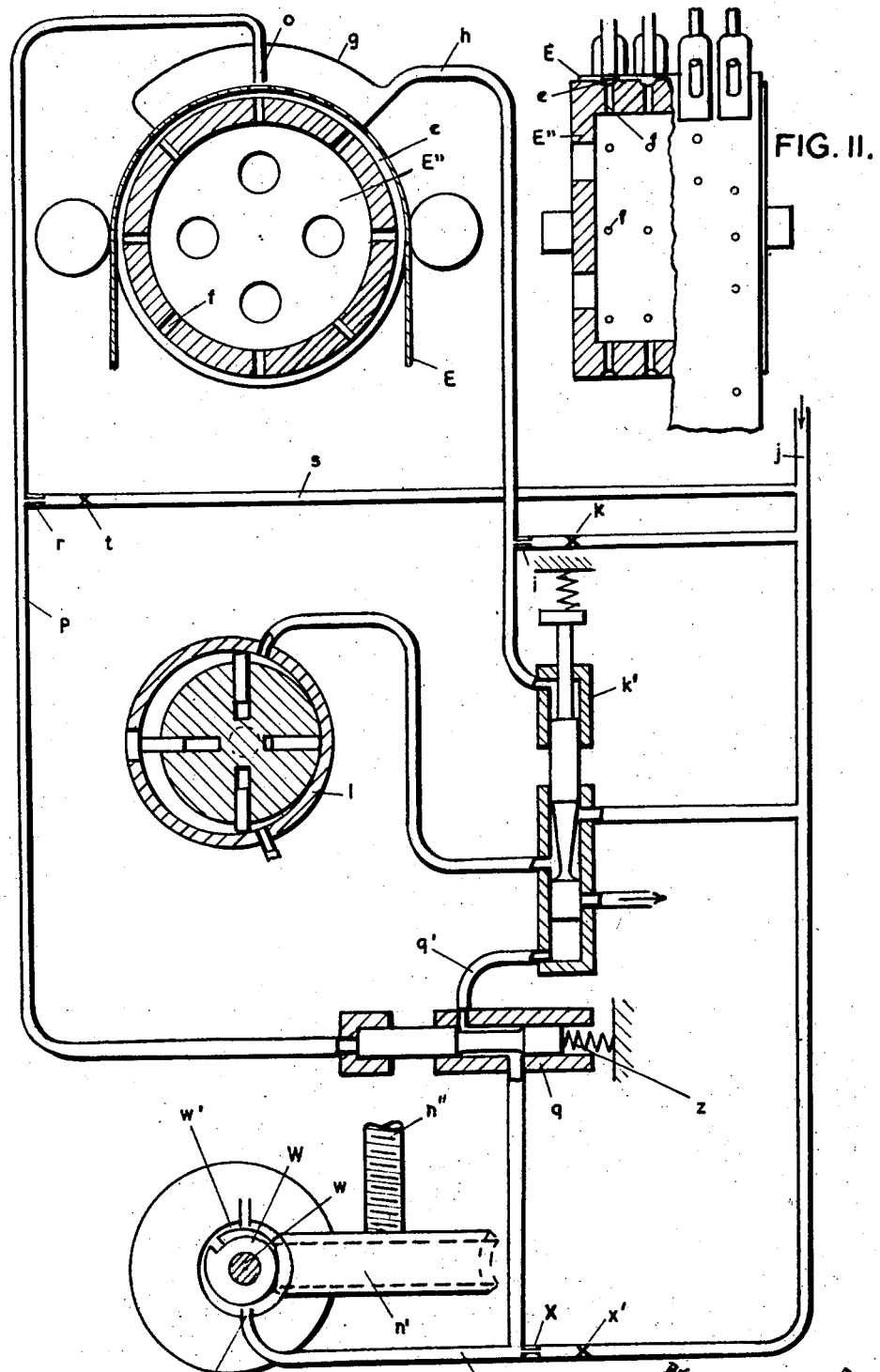

Dec. 12, 1961 B. M. G. GOLDMANN 3,012,545
MACHINES
Filed Sept. 3, 1957 9 Sheets-Sheet 6
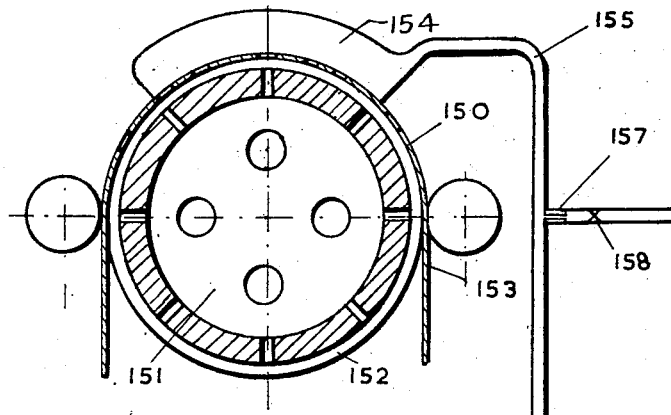
FIG. 12.
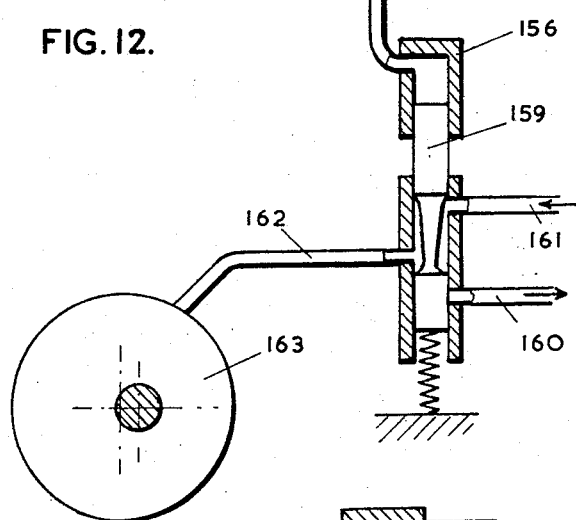
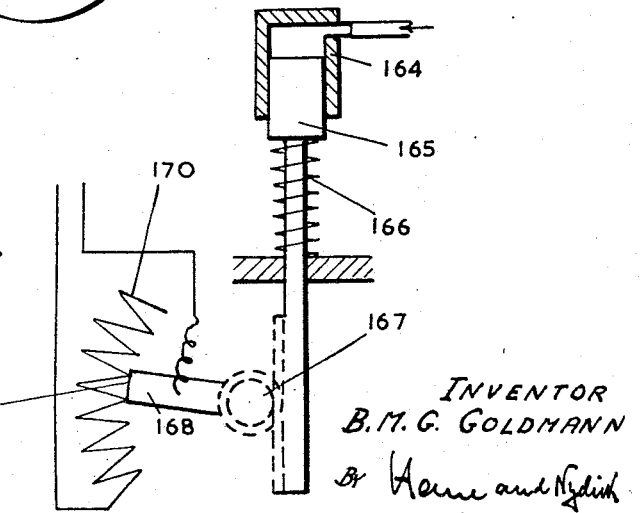
FIG. 13.
INVENTOR
B. M. G. GOLDMANN
ATTORNEYS Dec. 12, 1961    B. M. G. GOLDMANN    3,012,545
MACHINES
Filed Sept. 3, 1957    9 Sheets-Sheet 7

INVENTOR
B. M. G. GOLDMANN
By Hane and Hydich
ATTORNEYS

Dec. 12, 1961 B. M. G. GOLDMANN 3,012,545
MACHINES
Filed Sept. 3, 1957 9 Sheets-Sheet 8

INVENTOR
B. M. G. GOLDMANN
By Hane and Nydick
ATTORNEYS

Dec. 12, 1961   B. M. G. GOLDMANN   3,012,545
MACHINES
Filed Sept. 3, 1957   9 Sheets-Sheet 9

INVENTOR
B. M. G. GOLDMANN
By Hann and Nydick
ATTORNEYS

United States Patent Office 3,012,545
Patented Dec. 12, 1961

3,012,545
MACHINES
Boleslaw Marjan George Goldmann, East Cowes, Isle of Wight, England (40 Milton St., Darlington, County Durham, England)
Filed Sept. 3, 1957, Ser. No. 681,847
4 Claims. (Cl. 121—45)

This invention is concerned with improvements in or relating to machines having a part movable relative to a second part, and more particularly to milling machines, lathes and the like, in which a table and/or slide is moved with respect to a bed to move a workpiece relative to a tool, or vice versa.

According to the present invention I provide a machine comprising at least one movable part, means for driving that part in two directions, pneumatic pick-up means, and means for driving a record tape past the pick-up means, the pick-up means comprising two pick-ups each arranged to cause the driving means to move the movable part in one direction a unit amount for each unit of data on the record tape which during operation registers with that pick-up.

The term record as used herein is intended to include for example paper, metal or plastic strips having holes punched therein.

Where the machine comprises a lathe the movable part may be a cross-slide carrying a tool. The driving means may comprise a pawl and ratchet mechanism for rotating a lead screw and the pick-up upon receiving a sequence of units of data i.e. a sequence of perforations, would move the cross-slide in one direction, a unit amount for each unit of data of the sequence of units received.

In order that my invention may be well understood, I will now describe, by way of example, some embodiments thereof with reference to the accompanying drawings, in which:

FIGURE 1 is a perspective view of a vertical milling machine;

FIGURE 1a is a plan of one form of record for feeding to a control for the machine of FIGURE 1;

FIGURE 2 is a horizontal section through a workpiece and a tool;

FIGURE 3 is a section through a tool and another workpiece;

FIGURE 3a is a plan of a record for milling one face of the workpiece of FIGURE 3;

FIGURE 3b is a plot of the theoretical and actual path of the workpiece controlled from the record of FIGURE 3;

FIGURE 3c is a plot of a theoretical and actual path of a workpiece controlled from a further record;

FIGURE 4 is a plot of a theoretical and actual path of a tool axis when milling an arc of a circle;

FIGURE 4a is a plot showing the envelope formed by a tool of a diameter ten times the amount of unit feed of the tool following the plot of FIGURE 4;

FIGURE 4b is a plot of the theoretical and actual path of a tool moved in a different manner to mill an arc of a circle;

FIGURE 4c is an envelope formed by a tool of a diameter ten times the amount of unit feed of the tool following the plot of FIGURE 4b;

FIGURE 5 is a diagrammatic illustration of a pick-up and driving means;

FIGURE 6 is a diagrammatic illustration of a relay valve of FIGURE 5 in a second operative condition;

FIGURE 7 is a section on the line VII—VII of FIGURE 5;

FIGURE 8 is a diagrammatic illustration of another embodiment of driving means;

FIGURE 10 is a diagrammatic layout of an embodiment of driving means, pick-up and speed control;

FIGURE 11 is a part sectioned side view of the pick-up mechanism of FIGURE 10;

FIGURE 12 is a diagrammatic layout of a speed control;

FIGURE 13 is a diagrammatic layout of another embodiment of speed control;

Figure 9:
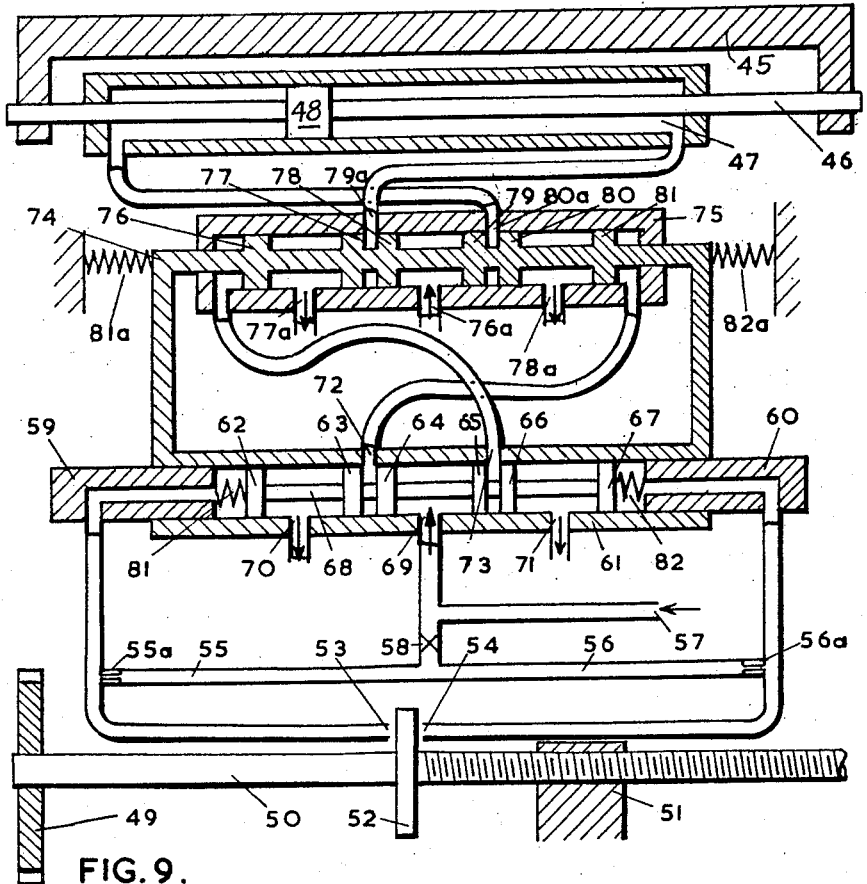
FIGURE 9 is a diagrammatic plan of a driving means eliminating backlash.

In FIGURE 1 is shown a vertical miller having a bed 1, a table 2, a slide 3 and a tool 4. The table is movable along the bed in two directions, herein termed east and west, and the slide is movable on the table in two directions herein termed north and south.

To operate the machine a record having four tracks (FIGURE 1a) is required. A track A moves the slide north, a track B moves the slide south, a track C moves the table west and a track D moves the table east. In order to mill a block 5 (FIGURES 1 and 2) being a 1" square, the tool axis must travel, relative to the block, the course shown in chain lines in FIGURE 2.

Assuming that driving means (not shown) for the table and slide provide a unit feed of .001" for each perforation of the record and that the tool is ½" diameter, then to mill one side of the block the table must move a distance equal to the length of the block plus overrun of the tool, i.e. 1"+2×¼=1½", which at the above rate of feed would require 1.5/0.001=1500 perforations. To move the periphery of the block past the tool, therefore, 1500 perforations would be required on each track.

The record would run at a constant speed past four pick-ups, one over each track. As soon as the first perforation would pass the pick-up on track A, it would cause, as will appear, a movement of the feed mechanism for direction north which would move the table in that direction by 0.001" and each of the following perforations on the same track would result in yet another movement by exactly the same amount.

In order to produce a contour at an angle of 45° say, in direction north-east (see FIGURE 3) on a block 6, the recording would bear a perforation on track A (direction north), followed by one on track D (direction east), then one on track A, followed again by one on track D, etc. (see FIGURE 3a).

By using a record such as that illustrated in FIGURE 3a, the path of the block is in the direction illustrated by the broken line of FIGURE 3b and the theoretical path is in the direction illustrated by a full line.

Similarly to mill a bevel at a ratio of 1/3, the perforation on track A would be followed by three on track D, followed by one on track A, then three on track D, etc., the actual path of the block then being in accordance with the broken line of FIGURE 3c and the theoretical path in accordance with the full line of that figure.

Curves could be produced by resolving them in the appropriate co-ordinates (see FIGURE 4).

As can be seen, for example where the cutter is moved instead of the workpiece, the actual path of the cutter need never deviate from the theoretical path by more than the magnitude of the unit feed. Since the radius of the cutter would be very large in relation to the feed, the accuracy and finish would be much greater. This can be seen by observing the envelope formed in FIGURE 4a by a radius of cutter only 10 times greater than the unit feed.

A further smoothing out of the path of the centre of the cutter could be effected by operating simultaneously the N or S and E or W movement whenever the tangent to the curve approaches an angle of 45° in respect to those movements. The path of the centre of the cutter on FIGURE 4 would be modified to the one shown on FIGURE 4c.

The cost of recording tape would be negligible. Assuming that the tape is made of paper and that the perforations are each of a diameter of ⅛" then the spacing need not be more than ¼" and to machine the above-mentioned 1" square it would require 4×1500=6000 imprints, or 6000/¼=1500" or 125 feet of paper tape say 1" wide. The cost of the material compares therefore favourably with the cost of the material for a template, to say nothing about the cost of the material for a cam.

For a variety of reasons, the actual component rarely corresponds perfectly to the master. A subsequent modification of the master in order to obtain the desired form of the component is very difficult and often impossible.

However a recording can easily be modified by inserting additional perforations or obliterating some of them; e.g. a piece of paper tape could be cut out and a modified piece stuck in its place.

Errors in the pitch of the leadscrews which might affect the accuracy of work with small tolerances such as profile grinding, could be corrected in the same manner.

The form of driving means may be adapted to suit the machine or materials being handled. I use compressed air as the motive force. By way of example I will now described a driving means and control for the table of the milling machine of FIGURE 1.

Referring to FIGURES 5 to 7, the mechanism comprises a pick-up for each of the two tracks of a record E bearing data for the table, each pick-up having a compressed air inlet 10 (FIGURE 5), a reduction valve 11 and a jet 12 across the outlet of which the record passes on a backing 13 having an opening 14 opposite the jet. From the compressed air inlet a conduit 15 passes to a relay valve 16 and from the jet 12 extends a second conduit 17 to the valve 16. The valve 16 comprises a casing 18 having a central bore in which is a double ended piston 19 spring urged against compressed air at reduced pressure entering via conduit 17 and to a position coupling conduit 15 to a motor supply line 20 and closing an exhaust outlet 21. Thus when a hole in the tape in opposite to the jet 12 the air at reduced pressure escapes via outlet 14 (FIGURE 5) and conduit 17 exhausts, while compressed air passes through the relay valve 16 to a motor. Continued movement of the tape by rollers F, F¹ closes jet 12, the air at reduced pressure surges along conduit 17 and urges the piston (FIGURE 6) against its spring to close conduit 15 and open the exhaust outlet 21 to release compressed air from the motor supply line.

The driving means comprise a ratchet wheel 22 keyed to the leadscrew shaft 23 of the table for driving the leadscrew in one direction and a feed motor is provided comprising a plunger 24 movable in a cylinder 24a by compressed air, from line 20 and by a spring 25, and carrying a pawl 26. For opposite direction of travel of the table a second feed motor comprising a plunger 27 in a cylinder 27a is provided actuated by compressed air, controlled by a second relay responsive to a second track on the record, and a spring 28, and carrying a second pawl 29. Each pawl is spring loaded to ensure its return to a driving position when it is lifted by a tooth of the wheel when the wheel is being driven by the other pawl. In FIGURE 5 pawl 26 is shown held in its driving position by spring 30.

Thus the leadscrew moves the table in the N-S directions, one track A causing the control to drive the table in the direction N, the other track B causing the control to drive it in the direction S. The movement of the table in the directions W-E would be effected by another leadscrew with two feed motors controlled by the tracks C and D. In this particular case there would be two leadscrews, two ratchet wheels, four feed motors, four relay valves and pick-ups.

In order to minimise unbalance and its effects, each feed motor may be arranged so that the plunger could move in one direction and its cylinder in the opposite direction, each operating a pawl either directly or through a suitable mechanism.

Such an arrangement is shown in FIGURE 8, the plunger 24 being mounted in a cylinder 31 slidable in a guide 32, springs 33 and 34 urging the plunger and cylinder respectively towards each other. The pawl 26 is arranged as in FIGURE 5 and a second pawl 35 is mounted on a bell crank 36 pivoted at 37. In this arrangement the supply line is provided with a flexible section 38 to accommodate movement of the inlet to the feed motor.

In order to damp the shock of the sudden movement of the ratchet wheel, a resilient member or mechanism may be inserted between the ratchet wheel and its shaft.

For very small unit feeds, the ratchet wheel could operate the leadscrew not directly, but through a suitable reduction mechanism, such as a worm and a worm wheel drive.

With some machines it is too expensive or impossible to obtain a lead screw of high accuracy capable of transmitting heavy loads which make elimination of backlash difficult.

An arrangement for removing loads from the leadscrew and eliminating backlash is shown in FIGURE 9. A table 45 is mounted upon a rod 46 extending through a hydraulic cylinder 47 and carrying a piston 48. The hydraulic cylinder is fixed. To move the table a ratchet wheel 49 is provided on a small leadscrew 50 free to move longitudinally and engaging a nut 51 secured to the table 45. On the leadscrew 50 is a flange 52 against which two low pressure air outlets 53, 54 are directed. Such outlets 53, 54 are coupled through conduits 55 and 56 and control jets 55a and 56a respectively to a compressed air source 57 through a reduction valve 58, and to fixed blocks 59 and 60 respectively carrying a cylinder 61. In cylinder 61 are six discs 62–67, secured to a rod 68, a compressed air inlet 69, two exhaust ports 70, 71 and a pair of outlets 72, 73. The cylinder 61 carries rigidly with respect thereto a rod 74 extending through a fixed cylinder 75, the rod carrying discs 76 to 81. Cylinder 75 has an oil inlet 76a coupled to an oil pump (not shown), two oil exhaust ports 77a, 78a coupled to a sump (not shown) and two oil outlets 79a, 80a.

The rod 68 is balanced in cylinder 61 by a pair of springs 81, 82, and the rod 74 in cylinder 75 by springs 81a, 82a.

In operation, when the ratchet is moved by a feed motor the leadscrew 50 moves through the nut 51 for example to the right as viewed in FIGURE 9 whereby jet 53 opens releasing low pressure air from the left hand end of cylinder 61 and jet 54 closes building up pressure against disc 67. Low pressure air on disc 67 at the right hand end of the cylinder 61 causes rod 68 to move to the left with its disks and causes these to be located so that the compressed air inlet 69 is coupled to the outlet 72 while outlet 73 is coupled to exhaust port 71. Compressed air is then supplied to the right hand end of cylinder 75 causing the rod 74 to move to the left and causing cylinder 61 to move to the left to again close port 72. Rod 74 carries the discs 76 to 81 into a position where oil may pass from the inlet 76a to the right hand end of cylinder 47 causing the table and the nut 51 to move to the left, until the nut has carried the leadscrew to the left to again open the jet 54 whereupon the parts 68 and 74 are returned to their original positions exhausting the compressed air line 73 and the oil line 79a. In such a manner an accurate small leadscrew is used to operate the air and oil valves which only move the table over a unit feed. The only place where backlash can occur is between the nut and leadscrew, but since these are small and have to withstand no load except for the flange, the backlash is negligible. Movement of the flange in the opposite direction causes opposite movement of the table.

A further embodiment of drive comprises an air motor or air motors. In the case of a single motor the motor comprises a casing in which is mounted eccentrically a rotor having outwardly sprung blades engaging the interior of the casing. In the casing is an inlet port coupled to a relay valve, and an exhaust port. The rotor is secured to a shaft carrying a worm engaging a pinion on the leadscrew for example of the slide. Passage of a hole in that track of the record controlling the slide past a pick-up causes the relay valve of that pick-up, coupled to the inlet, to allow momentarily a stream of compressed air to reach the sector between blades on either side of the inlet causing the rotor to turn until that sector is in communication with the exhaust port at which stage the rotor stops by virtue of the exhaustion of the compressed air.

A second inlet is provided for driving the motor in the reverse direction, the second inlet being coupled to the pick-up on the track complementary to that operating the motor through the first inlet.

Alternatively two motors may be used each having a single inlet, both motors being coupled to the shaft, and the inlet being positioned so that the motors will drive the shaft in opposite directions.

To provide a high degree of steadiness in the movement of the movable part and to make the rate of movement directly proportional to the number of units of movement to be made I may adopt the embodiment shown in FIGURES 10 and 11. In this case the record tape E is passed around a cylinder $E^{11}$ in which there is a groove $e$ for each track and a plurality of exhaust vents $f$ extending from each groove. A cowling $g$ extends over part of the cylinder and is coupled through conduit $h$ to a control jet $i$ extending from a compressed air supply line $j$ in which there is a reduction valve $k$. The line $h$ extends past the jet to a relay valve $k$ which may be generally of the type shown in FIGURE 5 coupled to the compressed air supply line $j$ and to an air motor $l$ such as above described.

The holes in the track pass under the cowling and according to the number of holes under the cowling, so the air pressure above the piston in the relay valve drops, allowing the valve to rise. The piston is tapered and the extent to which the piston is moved regulates the amount of air to be passed to the air motor. In this manner the speed of the air motor is directly in proportion to the number of holes in the tape under the cowling. Where a number of successive unit feeds are dictated by a track, the speed of the motor rises as the series of holes enters the cowling and drops steadily as the number of holes drops at the end of the sequence. By means of this arrangement where a curved face is being milled the surface of the workpiece may be more smoothly produced and steps largely eliminated therefrom.

Over a long range, however, in spite of the taper in the relay valve piston, a cumulative error is hardly avoidable and this would be corrected in the following manner: A jet $o$ covering only one hole in the track would be arranged in the middle of the cowling $g$.

The jet $o$ is coupled through line $p$ to a second relay valve $q$, a jet $r$ in a line $s$ from the supply and containing a reduction valve $t$ opening into the line $p$. Relay $q$ is coupled by a line $q^1$ to the bottom of a modified relay valve $k^1$ and through a line $v$ to a jet $v^1$ directed on to a cam W, mounted on a shaft $w$ coupled to motor $l$ and carrying worm $w^1$ for engaging a worm wheel $n^1$ on a leadscrew $n^{11}$. A jet X is coupled to the supply through a reduction valve $x^1$ opening into line $v$. A drop of pressure would occur in the line $p$ whenever a hole in the recording would pass jet $o$. The drop in pressure would cause a $z$ spring to displace relay valve $q$ which would cause air from jet $x$ to pass jet $v^1$ opposite the cam W. The cam W revolves in synchronism with the movement of the slide or table and lets different amounts of air escape from the jet $w$. The cam would be shaped so that the amount of escaping air would be greatest whenever the cam (and therefore the table or slide) would run ahead of its prescribed path. Thus overrunning of the cam would cause a drop in pressure in line $v$, displacement of relay $q$ to the left by spring $z$ to a position which would cause a corresponding drop in pressure in the bottom end of the valve $k^1$, thus reducing the volume of air supplied to the air motor and consequently slowing down the speed of the table. If the cam runs too slow the amount of air escaping from the jet $v^1$ would be reduced and the opposite would happen, namely movement of relay $q$ to the right causing an increase in pressure under the piston of relay $k^1$ and passage of more air to the motor.

A second cam (not shown) is mounted on shaft $w$ for co-operation with a second jet for counteracting overrun in the opposite direction the second jet being coupled through a relay such as relay $q$ to a relay such as $k^1$ which could be coupled to the opposite side of motor $l$ to provide drive of the shaft in the opposite direction to that provided by relay $k^1$.

It may be desired to provide a variable speed drive for the spindle of a lathe, boring machine or the like, and it may be desirable that the variations in speed be of steady form as opposed to stepped variations. The mechanism described with reference to FIGURES 10 and 11 may be adapted for providing a variable speed control. In FIGURE 12 such an adapted mechanism is shown. An additional track is provided upon the record for controlling the spindle speed, and if it is desired that the spindle be reversible, a second track is provided for speed control when the spindle is rotating in the reverse direction. The mechanism for control of speed in one direction comprises a record 150 passing over a drum 151 having a groove 152 from beneath each track and vent holes 153 from each groove. A cowling 154 extends over part of each groove and is coupled by line 155 to a valve 156. Into line 155 opens a jet 157 connected to a compressed air supply source through a reducing valve 158. Valve 156 has a tapered piston 159, an exhaust port 160, a compressed air inlet 161 and an outlet 162 coupled to a motor 163 for driving the spindle, preferably through a worm gear. The operation of the mechanism is similar to that of the mechanism of FIGURE 10. If desired the motor may be oil driven in which case the exhaust port 160 is coupled to an oil return line.

A further embodiment of variable speed control for a spindle is shown in FIGURE 13. In this case the cowling is coupled instead of to a relay, to a cylinder 164 containing a piston 165, the rod 166 of which operates a rack and pinion 167, the pinion of which operates an arm 168 carrying a brush 169. The brush engages a coil 170 and the arm and coil are wired into the supply line to an electric motor for driving the spindle. In operation a drop in pressure in cylinder 164 (caused by a number of holes in the record passing under the cowling) causes the piston 165 to rise and the rack and pinion to reduce the number of turns of coil in the supply line to the motor to increase the spindle speed.

Where control of speed in two directions is required, a second track, cowling and control valve are provided, and where an air motor is used to drive the spindle, the two control valves may be coupled to it on opposite sides.

Where it is essential that spindle speed control be exact, for example when turning a fluted or like spindle, then the mechanism of FIGURES 10 and 11 must be used, for an accumulated error may arise with the mechanisms of FIGURES 12 and 13.

Figure 14:
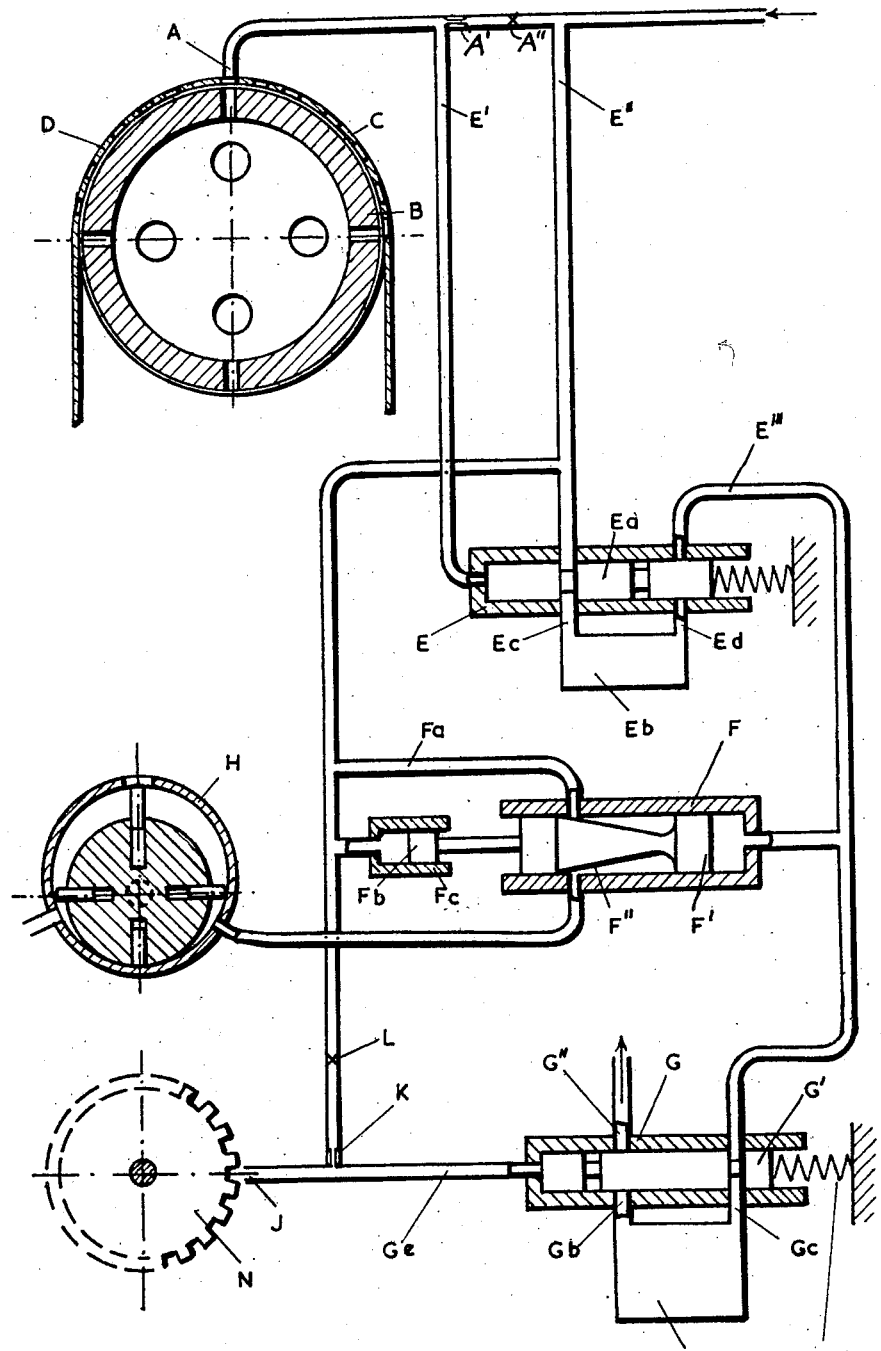
FIGURE 14 is a part sectional diagrammatic layout of another form of control and driving means.

A further embodiment of the feed control is shown in FIGURE 14. In this case the pick-up comprises a jet A opening over a drum B having a groove C and perforations D. The jet A is coupled to a compressed air supply through control jet $A^1$ and reducing valve $A^{11}$. A valve E is coupled at one end by pipe $E^1$ to the low pressure air line to jet A, by pipe $E^{11}$ to the compressed air supply and by pipe $E^{111}$ to a relay valve F and a valve G.

Valve spindle $Ea$ of valve E is spring biased in a sense opposite to the bias caused by low pressure air in line $E^1$ and valve E is coupled to an air chamber $Eb$ by pipes $Ec$ and $Ed$, the chamber preferably being of adjustable volume.

Valve spindle $F^1$ of valve F is tapered as at $F^{11}$ and valve F is coupled to the compressed air supply by pipe $Fa$ and to an air motor H. Carried by spindle $F^1$ is a piston $Fb$ in a cylinder $Fc$ coupled also to the compressed air supply source.

Valve G has a spindle $G^1$, an exhaust port $G^{11}$, and is coupled to an air chamber $Ga$ by pipes $Gb$ and $Gc$. Spindle $G^1$ is biased by a spring $Gd$ in one sense and by low pressure air entering by pipe $Ge$ from a control jet K and reduction valve L when a jet J extending from line $Ge$ is closed by a projection of a castellated pinion N on the motor shaft.

In operation a hole in the record registers with jet A. Valve spindle $Ea$ moves to the left admitting compressed air to chamber $Eb$, line $Ed$ being closed and $Ec$ open. As soon as the hole has moved past jet A spindle $Ea$ moves again to the right closing line $Ec$ and opening line $Ed$. The air trapped in chamber $Eb$ is now released and enters valve F, spindle $G^1$ being in a position closing line $Gc$. Valve sprindle $F^1$ moves to the left admitting air to the motor until such time as jet J is opened by movement of the pinion at which stage spindle $G^1$ opens line $Gc$ whereby valve spindle $F^1$ moves back to the right and cuts off the air supply to the motor. The motor will overrun sufficiently to again close jet J which causes spindle $G^1$ to close line $Gc$ and exhaust chamber $Ga$.

There is a small delay in the initiation of the mechanism so that should a sequence of holes pass jet A the valve F will open further and the motor will travel faster as a result, so that the motor speed is proportional to the amount of feed to be applied to the movable part.

Magnetic brakes could also be applied to the other already described methods of control, e.g. the piston in FIGURE 6 could at the end of the stroke close a circuit operating a magnetic brake.

Although eventually it might be advantageous to design special machines for use with recordings, standard milling or other machines could be used at any time just by replacing the handwheels by ratchet wheels and electric or pneumatic feed motors with suitable reduction gear.

The principles and mechanisms so far described, can be applied to produce three dimensional curves by providing a third direction of movement, at right angles to the N-S and W-E movement, i.e. up and down. This could be effected by a vertical leadscrew, operated by two more feed motors, one for each direction, two more relays and two more pickups, the latter scanning fifth and sixth tracks on the recording.

One of the difficulties in milling of profiles is the change of radius after sharpening. This ordinarily requires a change in the path of the centre of the cutter which can be done by using a different recording. Another solution of this problem is as follows: The axis of the spindle would be inclined in respect to the work surface, and the cutter tapered, so that the flank at the line of contact would have the required angle of the work surface. A reduction of the diameter after sharpening would be compensated for by displacing the spindle and cutter in an axial direction. In order to maintain the correct form of the work surface, the housing with the cutter spindle would swivel around an axis vertical to the plane of the curve of the profile, so that the plane through the axis of the pivot and the axis of the spindle would be normal to the work surface at the line of contact. Control of this swivelling motion could be effected by two additional tracks, two feed motors, a ratchet wheel, and a worm and wormwheel drive, one for each direction of rotation of the housing.

Figure 15:
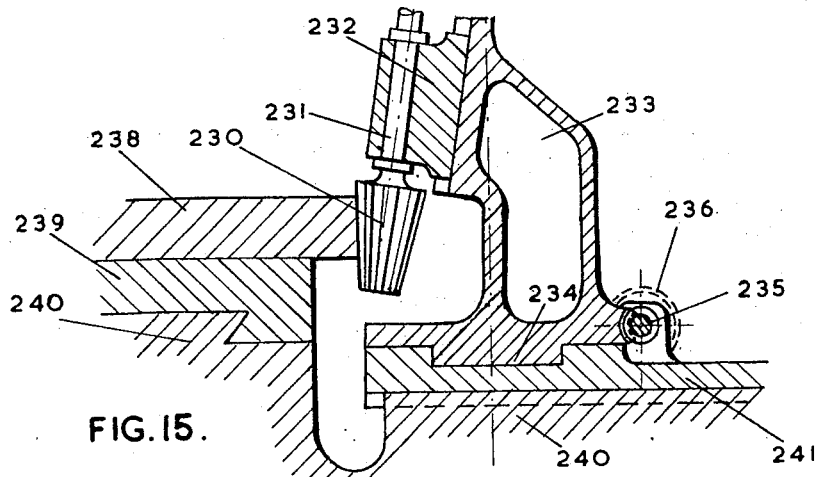
FIGURE 15 is a sectional elevation of part of a milling machine.
Figure 16:
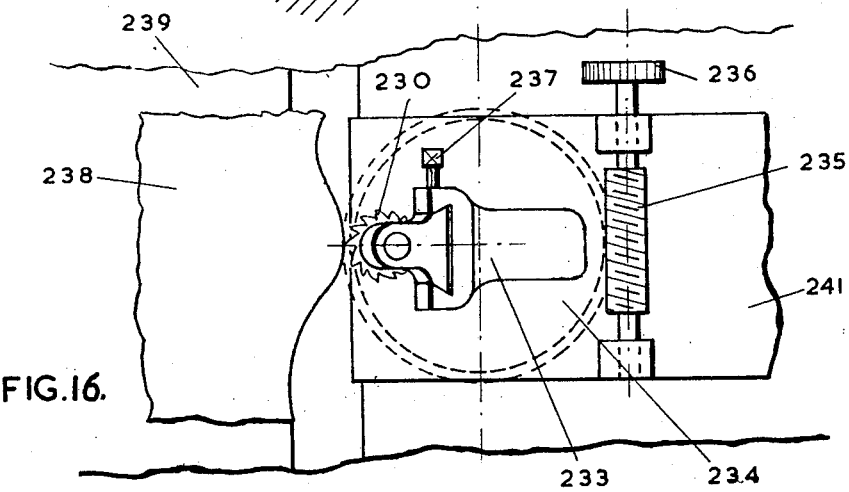
FIGURE 16 is a plan view of the part shown in FIGURE 15.
Figures 17, 18:
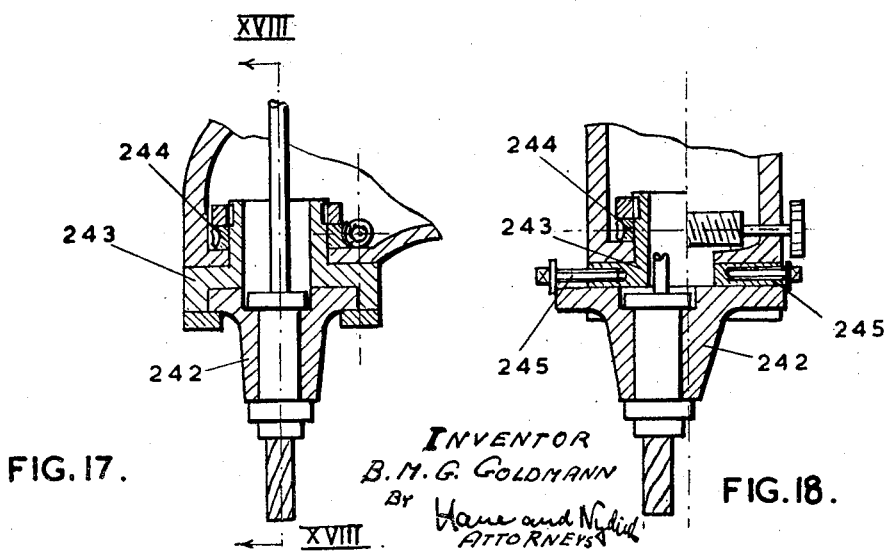
FIGURE 17 is a cross-sectional elevation of part of another embodiment of milling machine.
FIGURE 18 is a cross-section on the line XVIII—XVIII of FIGURE 17.
Figure 20:
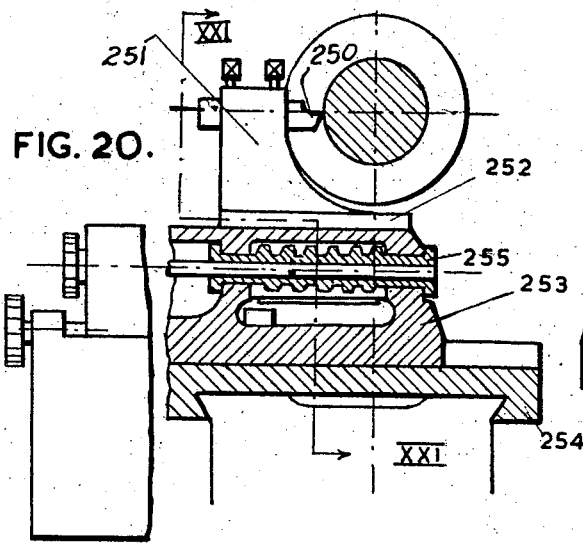
FIGURE 20 is a section on the line XX—XX of FIGURE 19.

In FIGURES 15 and 16 is shown a milling machine incorporating such an arrangement. A conical tool 230 is secured to a shaft 231 riding in a bearing slide 232 on a post 233. The post is mounted on a plate 234 rotatable by means of a worm 235 operated through a ratchet wheel 236 actuated by a pick-up such as heretofore described and the plate is movable on a slide 241 relative to a bed 240 for example by a leadscrew (not shown). Upon sharpening of the tool, and hence reduction of the diameter, the distance from the cutting flank to the axis of rotation of the plate is reduced if the slide 232 is maintained in the same position on the post. To maintain a uniform distance of the cutting flank from the axis of rotation of the plate, adjustment of the slide is made on the post after sharpening, a set screw 237 being provided for locking the slide. In such a machine the workpiece, such as 238 is carried on a table 239 sliding on bed 240 and controlled by two tracks, and the post 233 is mounted on plate 234 controlled by two tracks and the plate is on the slide 241 controlled by two further tracks. The plate and slide are manipulated so that at all times the same cutting flank is presented to the work and hence the distance of the flank from the axis of rotation is maintained uniform.

Where cylindrical cutters are used in a machine such as that in FIGURE 1, I provide an arrangement shown in FIGURES 17 and 18 for taking up tool wear. The tool is journalled in a slide 242 carried by a sleeve 243 rotatable by worm 244 in the machine head. When the tool diameter is reduced by sharpening, the tool axis is displaced in one plane by movement of the slide adjustment screws 245. The sleeve is then moved by the worm to maintain the plane in which the tool axis was displaced normal to the surface of the work piece so that the cutting flank of the tool is disposed in the same plane relative to the work as before the tool was sharpened. A record pick-up and driving means are provided for operating the worm.

Grinding, lapping and other operations in which the same problem occurs could be also improved by this method. An arrangement on the same lines could be used for the machining of profiles with varying angle of the work surface.

The axis of rotation of the sleeve, however, would have to tilt around an axis parallel to the plane of the curve. Obviously both methods could be combined by rotating the housing around two axis.

Similarly, single point tools such as turning tools could be swivelled on their supports in order to control the setting angle or in order to machine awkward corners, such as the periphery of a shaft and two adjoining opposite shoulders.

Figure 21:
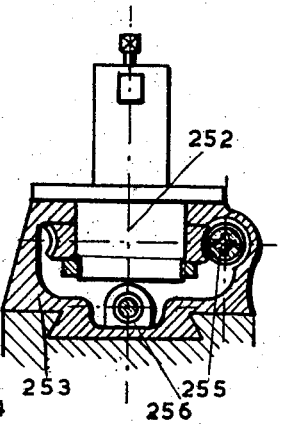
FIGURE 21 is a section on the line XXI—XXI of FIGURE 20.
Figure 19:
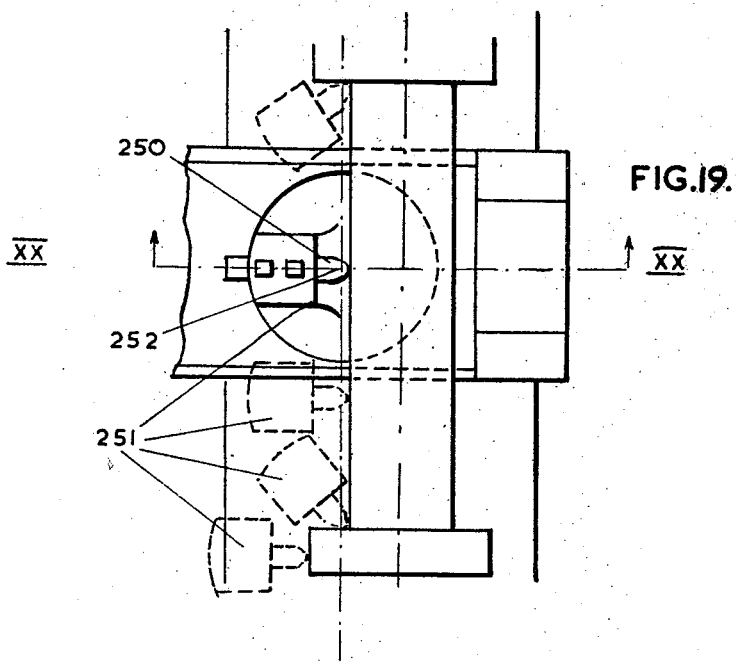
FIGURE 19 is a plan of another embodiment of cutting machine.

FIGURES 19 and 21 show such a shaft being machined by a tool 250 carried on a post 251 rotatable about an axis 252 and movable across the bed on a slide 253 and along the bed on a table 254, a worm 255 and screw 256 to actuate the post and slide and a screw (not shown) for actuating the table, each being controlled by two tracks on the record.

The above arrangement could be combined with a four way or similar tool post, whose indexing could be controlled by yet another track and feed motor or a four way or similar tool post could be indexed and swivelled under the control of a pair of tracks and a feed motor.

The recordings and mechanism already described could be used on automatic lathes, production milling machines, etc., supplanting the usual cams or other mechanisms. Speed changes, indexing, turning on and off the cutting fluid etc. could be controlled by separate tracks on the recording. Machines of this kind would not require special attachments to produce tapers or profiles. The simplicity in changing over from one job to another will be apparent when we consider that no cams or limit stops have to be changed or set. One recording with a set of pick-ups and relays could control any number of machines performing the same operation simultaneously. This might be especially useful in a kind of production like munitions, since ordinary capstan lathes or milling machines etc. could be converted into automatic or semi-automatic machines.

The application of "recordings" instead of templates or masters would be suitable for relieving lathes since it is "shakeproof." Mechanisms for copying the form by means of a tracing device are naturally affected by the inertia of the relieving slide, whilst the recording and pick-ups could be mounted on a separate stand.

Fast feeds could be controlled by separate tracks with their own relays and feed motors, their ratchet wheels however would have a coarser pitch or smaller ratio of the reduction gear.

Instead of moving the work table in milling and other machines, the spindle could be moved, or the work-piece moved in one direction, the spindle in another.

The above system of recordings and mechanisms can be applied to other machines, such as grinders (to move the work-piece and/or the grinding wheel as well as for profiling the latter), planing, shaping and slotting machines, oxygen cutting machines, automatic welding machines and welding positioners, multi-tool and profile turning lathes, practically any machine tool.

Mass production machines, such as transfer machines, could be simplified by the above method, since the recording could synchronise the movement of the work-piece from station to station by directly or indirectly operating the conveying mechanisms.

What I claim is:

1. In a machine having at least one moving part with actuating means for driving said part in two directions, a control system for said actuating means comprising, in combination, a pair of pneumatic pick-up means, a record tape having a pair of pneumatic pressure receptive sets of data determining the sequence of operation of said actuating means, drive means for moving said record tape past said pair of pneumatic record means with each set of data in association with one of said pair of pick-up means, each one of said pair of pick-up means controlling operation of said actuating means in one direction, said actuating means being responsive to effect movement of said movable part, a single unit in one direction for each unit of data registering with each of said pair of pick-up means, said actuating means comprising an air motor, a pair of relay valves coupled to said air motor, each relay valve having an inlet port for compressed air, whereby data passing a pick-up causes a charge of compressed air to open the relay valve to admit air to the motor coupled thereto, means for closing said relay valve after a predetermined rotational movement of said motor, each pick-up comprising a backing for the record, a vent in the backing beneath the track, a jet above the vent, a jet being arranged for coupling to a low pressure air supply and to control a movable member of the valve, said movable member controlling the compressed air inlet to and an outlet from an air reservoir, said movable member, while the jet is closed by a blank portion of the track, being urged by low pressure air to a position admitting compressed air to the reservoir, and said jet in response to being opened by a perforation forming a unit of the data registering therewith, being urged by resilient means to close the inlet to the reservoir and to couple the outlet thereof to the relay valve, whereby the closing of the jet causes the movable member to again open the inlet of and close the outlet of the air reservoir.

2. In a machine according to claim 1, in which the means for closing the relay comprise a second valve having a member movable in a cylinder, the member being biased in one direction and movable in the opposite by low pressure air, and being arranged to control an inlet port and an exhaust port of a second air reservoir, a member rotatable by the motor and having a series of spaced projections therearound, and a jet directed over the rotatable member, the jet being arranged to control the low pressure of air for actuating the movable member of the second valve, rotation of a motor causing a projection to move from a position closing the jet, thereby releasing low pressure air from the second valve causing the movable member to admit the charge of compressed air acting on the relay valve to the second air reservoir, reclosing of the jet by a succeeding projection on the rotatable member causing return of the movable member to open the exhaust port of the second air reservoir and close the inlet thereof.

3. In a machine according to claim 2, in which the relay valve includes a movable member having a piston head in a cylinder coupled to the pick-up valve for receiving air from the air reservoir of the pick-up and a second piston head movable in a cylinder having an inlet for coupling to a compressed air supply source, the area of the second piston head being selected so that a charge of low pressure air admitted to the relay valve by the pick-up valve will move the movable member of the relay valve against the action of compressed air on the second piston head.

4. In a machine according to claim 3, in which the relay valve is adapted to increase the size of the compressed air passage therethrough as the movable member therein is moved against the action of compressed air on the second piston head.

References Cited in the file of this patent

UNITED STATES PATENTS

| 825,277 | Rees | July 3, 1901 |
| 1,813,097 | Stoddard | July 7, 1931 |
| 1,978,502 | Moller | Oct. 30, 1934 |
| 2,254,098 | Ziebolz | Aug. 26, 1941 |
| 2,293,293 | Harcum | Aug. 18, 1942 |
| 2,372,426 | Johnson | Mar. 27, 1945 |
| 2,453,239 | Luhn | Nov. 9, 1948 |
| 2,504,013 | Ellis | Apr. 11, 1950 |
| 2,710,934 | Senn | June 14, 1955 |
| 2,736,629 | Smith | Feb. 28, 1956 |
| 2,882,864 | Booth | Apr. 21, 1959 |

OTHER REFERENCES

Binotrol, article reprinted from American Machinist of Aug. 1, 1955, 7 pages.